United States Patent
Benson

(10) Patent No.: US 9,222,372 B2
(45) Date of Patent: Dec. 29, 2015

(54) INTEGRATED POWER, COOLING, AND HEATING APPARATUS UTILIZING WASTE HEAT RECOVERY

(76) Inventor: Dwayne M Benson, Chandler, AZ (US)

( * ) Notice: Subject to any disclaimer, the term of this patent is extended or adjusted under 35 U.S.C. 154(b) by 556 days.

(21) Appl. No.: 12/802,219

(22) Filed: Jun. 2, 2010

(65) Prior Publication Data
US 2011/0296849 A1 Dec. 8, 2011

(51) Int. Cl.
| | | |
|---|---|---|
| F02C 1/05 | (2006.01) | |
| F03G 6/04 | (2006.01) | |
| F02C 1/06 | (2006.01) | |
| F02C 6/16 | (2006.01) | |
| F02C 6/18 | (2006.01) | |
| F01K 13/00 | (2006.01) | |
| F01K 25/10 | (2006.01) | |
| F25B 27/02 | (2006.01) | |
| F25B 7/00 | (2006.01) | |
| F25B 29/00 | (2006.01) | |

(52) U.S. Cl.
CPC .............. *F01K 13/006* (2013.01); *F01K 25/10* (2013.01); *F25B 7/00* (2013.01); *F25B 27/02* (2013.01); *F25B 29/003* (2013.01); *F25B 2400/141* (2013.01); *Y10T 29/49002* (2015.01)

(58) Field of Classification Search
CPC ........ F02B 41/10; F02B 37/005; F02B 37/02; F02B 3/06; F02B 75/02; F02G 5/02; F02G 5/04; F01K 23/065; F01K 23/04; F01K 23/02; F01N 5/02; Y02E 20/16; F02C 1/05; F02C 1/06; F02C 6/16; F02C 6/18
USPC ............. 62/238.4, 238.6, 238.7, 172; 60/653, 60/660, 670, 772; 165/50
See application file for complete search history.

(56) References Cited

U.S. PATENT DOCUMENTS

| | | | |
|---|---|---|---|
| 1,871,244 A | | 8/1932 | Stetted |
| 2,511,716 A | | 6/1950 | Katzow |
| 2,875,589 A | | 3/1959 | Horn |
| 3,153,442 A | | 10/1964 | Silvern |
| 3,720,842 A | * | 3/1973 | Martin et al. ................... 307/68 |
| 4,024,908 A | * | 5/1977 | Meckler ........................ 165/225 |
| 4,118,934 A | | 10/1978 | Brola |
| 4,271,679 A | * | 6/1981 | Schafer ........................ 62/238.4 |
| 4,531,379 A | * | 7/1985 | Diefenthaler, Jr. .............. 62/236 |
| 4,738,111 A | | 4/1988 | Edwards |
| 5,228,309 A | | 7/1993 | McCullough |
| 5,448,889 A | * | 9/1995 | Bronicki .................... 60/641.14 |
| 5,839,282 A | | 11/1998 | Bronicki et al. |
| 6,178,733 B1 | * | 1/2001 | Nelson ............................ 60/778 |
| 6,581,384 B1 | * | 6/2003 | Benson .......................... 60/653 |
| 6,606,860 B2 | | 8/2003 | McFarland |
| 7,178,358 B2 | | 2/2007 | Inaba et al. |

(Continued)

*Primary Examiner* — Frantz Jules
*Assistant Examiner* — Meraj A Shaikh
(74) *Attorney, Agent, or Firm* — Robert D. Atkins; Patent Law Group: Atkins and Associates, P.C.

(57) ABSTRACT

The present invention provides an apparatus for utilizing waste heat to power a reconfigurable thermodynamic cycle that can be used to selectively cool or heat an environmentally controlled space, such as a room, building, or vehicle. The present invention also integrates an electric machine, which may operate as a motor or generator, or both, and an additional prime mover, such as an internal combustion engine. Different combinations of these components are preferable for different applications. The system provides a design which reasonably balances the need to maximize efficiency, while also keeping the design cost effective.

11 Claims, 4 Drawing Sheets

(56) References Cited

U.S. PATENT DOCUMENTS

| | | |
|---|---|---|
| 7,523,621 B2 | 4/2009 | Johansson |
| 8,393,171 B2 | 3/2013 | Alston |
| 8,482,152 B1 | 7/2013 | Stahlkopf et al. |
| 2003/0000213 A1 | 1/2003 | Christensen et al. |
| 2003/0228237 A1* | 12/2003 | Holtzapple et al. ............ 418/171 |
| 2004/0088993 A1* | 5/2004 | Radcliff et al. ................ 60/772 |
| 2006/0218812 A1 | 10/2006 | Brown |
| 2007/0051126 A1 | 3/2007 | Okuda et al. |
| 2007/0280400 A1* | 12/2007 | Keller ............................ 376/317 |
| 2007/0289326 A1 | 12/2007 | Nishikawa et al. |
| 2008/0006040 A1 | 1/2008 | Peterson et al. |
| 2009/0266093 A1 | 10/2009 | Aoki |
| 2009/0266096 A1 | 10/2009 | Minds et al. |
| 2010/0319346 A1* | 12/2010 | Ast et al. ......................... 60/616 |
| 2011/0000182 A1 | 1/2011 | Lasker |
| 2011/0193346 A1* | 8/2011 | Guzman et al. ................. 290/52 |

* cited by examiner

INTEGRATED POWER, COOLING, AND HEATING APPARATUS UTILIZING WASTE HEAT RECOVERY

CROSS-REFERENCE TO RELATED APPLICATIONS

None.

FEDERALLY SPONSORED RESEARCH AND DEVELOPMENT

Not applicable.

BACKGROUND OF THE INVENTION

This invention relates to a method of integrating an internal combustion engine, an electrical machine, which can operate as a generator or a motor, a Rankine-type power cycle and an air conditioning and heating system to provide a self-contained, portable cooling, heating, and power system for an environmentally controlled space, such as a building, vehicle, or shelter.

Many industrial processes produce waste heat of low temperature, such that little useful work is generally accomplished with this waste heat. It is well known that certain thermodynamic cycles, such as absorption cooling, can provide environmental cooling even from low grade heat sources, such as thermal solar, engine exhaust, and bottoming cycles for industrial steam generators, but absorption cooling suffers from low efficiencies. In addition, cycles, such as absorption cooling, cannot easily integrate electrical power generation and do not lend themselves to compact and portable designs.

Prior art has not completely integrated heating and cooling with electrical power generation, or alternatively with an electric motor/generator to supplement the thermodynamic cycle with the electric motor during periods of low thermal energy availability. Furthermore, a self-contained system that includes a prime mover, such as an internal combustion engine, combined with power generation and heat and cooling functions, which are further supplemented by waste heat recovery from the engine exhaust have not been described. In the prior art, some systems use refrigerant as the working fluid to generate electrical power (Edwards, U.S. Pat. No. 4,738,111), commonly referred to as an Organic Rankine Cycle. Other systems provide for power and cooling, but use an external combustor, instead of an internal combustion engine (McCullough, U.S. Pat. No. 5,228,309). Many do not consider the need for recuperation, which transfers the remaining usable heat at the output of the Rankine expander to pre-heat fluid entering the heater or boiler.

Prior art for the apparatus that provides the heating and cooling functions have been well described elsewhere (Benson, U.S. Pat. No. 6,581,384). It can be summarized that none have maximized the efficiency achievable with a combined internal combustion engine, Rankine cycle and refrigeration cycle. Some approaches either do not recuperate heat from the working fluid (Steuart, U.S. Pat. No. 1,871,244) or do not recuperate heat in a fashion that maximizes the temperature of the working fluid entering the heating device (Brola, U.S. Pat. No. 4,118,934). Some systems attempt to only provide heating (Schafer, U.S. Pat. No. 4,271,679) or cooling (Horn, U.S. Pat. No. 2,875,589) but not both. Some add complexity by using separate working fluids for the power and heat pump cycles (Silvern, U.S. Pat. No. 3,153,442) (Schafer, U.S. Pat. No. 4,271,679) (Meckler, U.S. Pat. No. 4,024,908).

Hence, there is a need for a single system of sufficient efficiency and simplicity to make the manufacture and operation economically attractive. Since the intent of the system is to operate by recovery of heat from an integrated prime mover, the integrated power, heating and cooling system must be flexible enough to accommodate variable electrical and air conditioning loads and allow simple controls with a minimum of sensors and actuators.

SUMMARY OF THE INVENTION

The present invention provides a process and apparatus for integrating an internal combustion engine with a Rankine power cycle and a reconfigurable thermodynamic cycle that can be used to selectively cool or heat an environmentally controlled space, such as a vehicle, tent, or a building, plus generate electrical power. The internal combustion engine mechanically drives the integrated power, cooling, and heating system, and the heat generated by the prime mover is recovered to supply additional shaft power to help drive the heating and cooling cycle and supplement generation of electricity. The system provides a design which reasonably balances the need to maximize efficiency, while also keeping the design cost effective. Alternative configurations will be presented that incorporate a motor/generator, such that the heat pump cycle can be operated with electrical power, during times when external electricity is available.

The thermodynamic cycle of this invention is a combination of a fuel-powered internal combustion engine, a Rankine cycle to provide power and a refrigeration and heating cycle, commonly known as a heat pump. The three thermodynamic cycles are tied together both mechanically through common shafting and thermally through use of the Rankine cycle as a bottoming cycle for the internal combustion engine and a shared common fluid between the power, heating, and cooling cycles. For the closed thermodynamic cycles, a single working fluid is used in both liquid and gaseous phases. The advantage of a single working fluid is that the system can be designed with a minimum of dynamic seals and the overall system simplified by reducing the total number of components required. The integration of the internal combustion prime mover with the Rankine cycle and heat pump cycle create a number of flexible operating modes that are not obvious from the prior art. These are understood to be exemplary only and that other combinations of operating modes can be obtained by slight modification of the basic system.

a) The internal combustion engine can drive only the heat pump compressor in cooling mode, without generating electricity.

b) The internal combustion engine can drive only the heat pump compressor in heating mode, without generating electricity.

c) The internal combustion engine can drive both the generator and the heat pump compressor in cooling mode.

d) The internal combustion engine can drive both the generator and the heat pump compressor in heating mode.

e) The internal combustion engine is not used and the generator can act as a motor and drive the heat pump compressor in cooling or heat mode by using externally available electricity.

The self-powered, integrated system is preferable for portable, self-contained systems that provide combined electrical power, cooling and heating. The system could still be supplemented with external thermodynamic energy, in addition to the heat scavenged from the prime mover.

OBJECTS AND ADVANTAGES

Accordingly, besides the objects and advantages of the cooling, heating, and power apparatus described above, several objects and advantages of the present invention are:

(a) to provide a self-contained, portable system with a fuel-powered prime mover which can provide direct shaft power, where that shaft horsepower can easily be apportioned between providing heating or cooling and providing electrical power. Directly driving the heat pump compressor from the fuel-powered prime mover provides a system that is more energy efficient than generating only electricity and then using an electric motor to drive the compressor.

(b) to provide a means for supplementing the prime mover shaft power with shaft power from an expander, where the energy to drive the expander is scavenged from the prime mover. Designing the expander to mechanically supplement the shaft power of the fuel-powered prime mover provides a more efficient system than having the expander generate electricity, which then supplies an electric motor to drive the heat pump compressor. Optionally, the Rankine cycle, which drives the expander may be supplemented by an external heat source, in addition to scavenging heat from the fuel-powered prime mover.

(c) to provide a self-contained, portable cooling, heating, and electrical power system which is simple in design and, therefore, is more cost effective to manufacture.

(d) to provide a system which is efficient, flexible in accommodating a variety of load conditions, and easy to control.

The novel features which are believed to be characteristic of the invention will be better understood from the following description, both to its organization and method of operation. Further objects and advantages will be apparent, when considered in connection with the accompanying drawings, in which presently preferred embodiments of the invention are illustrated by way of example. It is expressly understood that the drawings are for the purpose of illustration and description only, and are not intended as a definition of the limits of the invention.

DETAILED DESCRIPTION OF VARIOUS EMBODIMENTS

The embodiments described herein are for the purposes of illustration only, and it is understood by those familiar in the art that numerous other embodiments are possible. In one embodiment of the invention, as illustrated in FIG. 4, the apparatus is configured in the preferred embodiment for the cooling mode.

Figure 1:
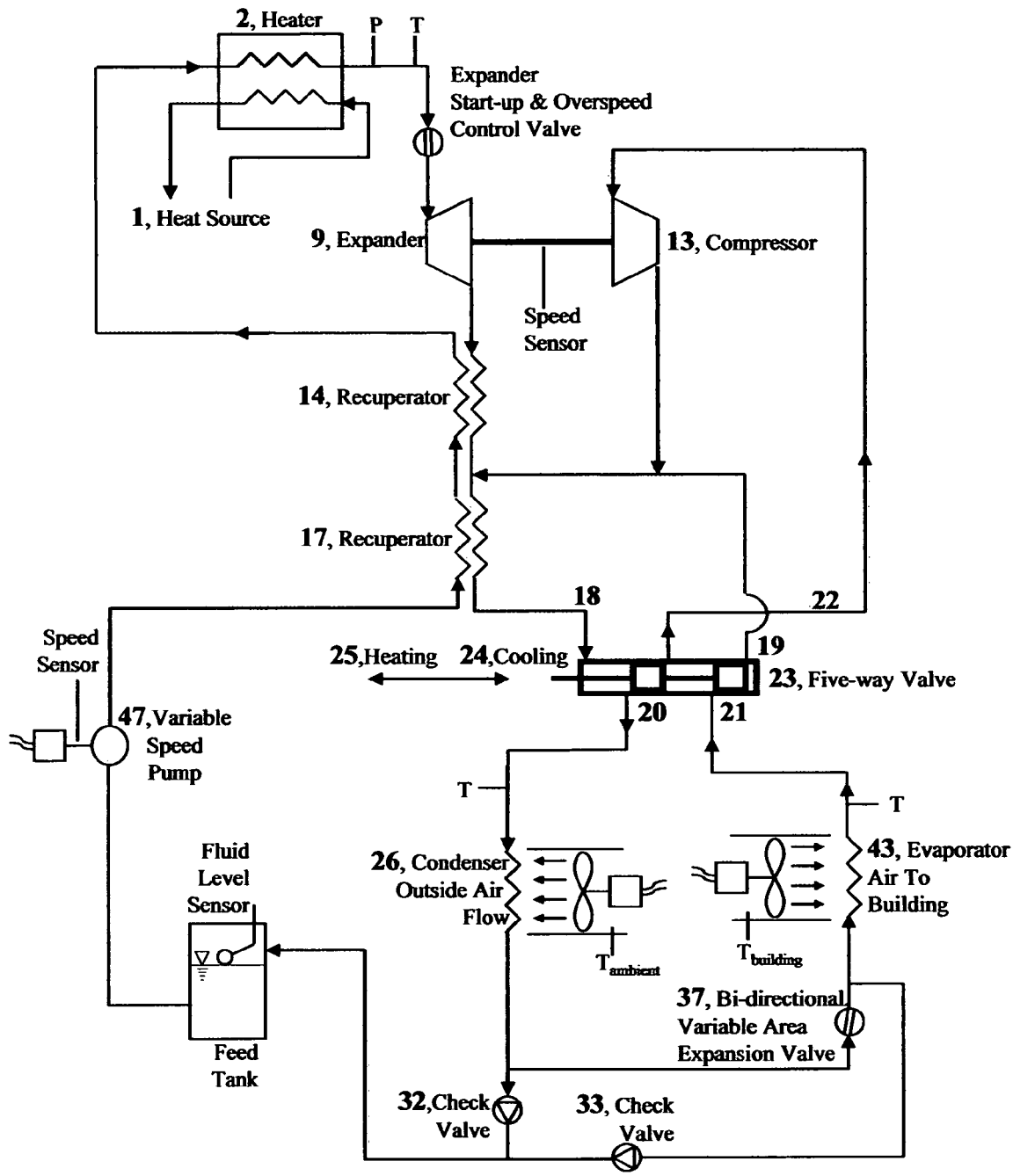
FIG. 1 is a diagrammatic view of the prior art apparatus as configured for cooling an environmentally controlled space.
Figure 2:
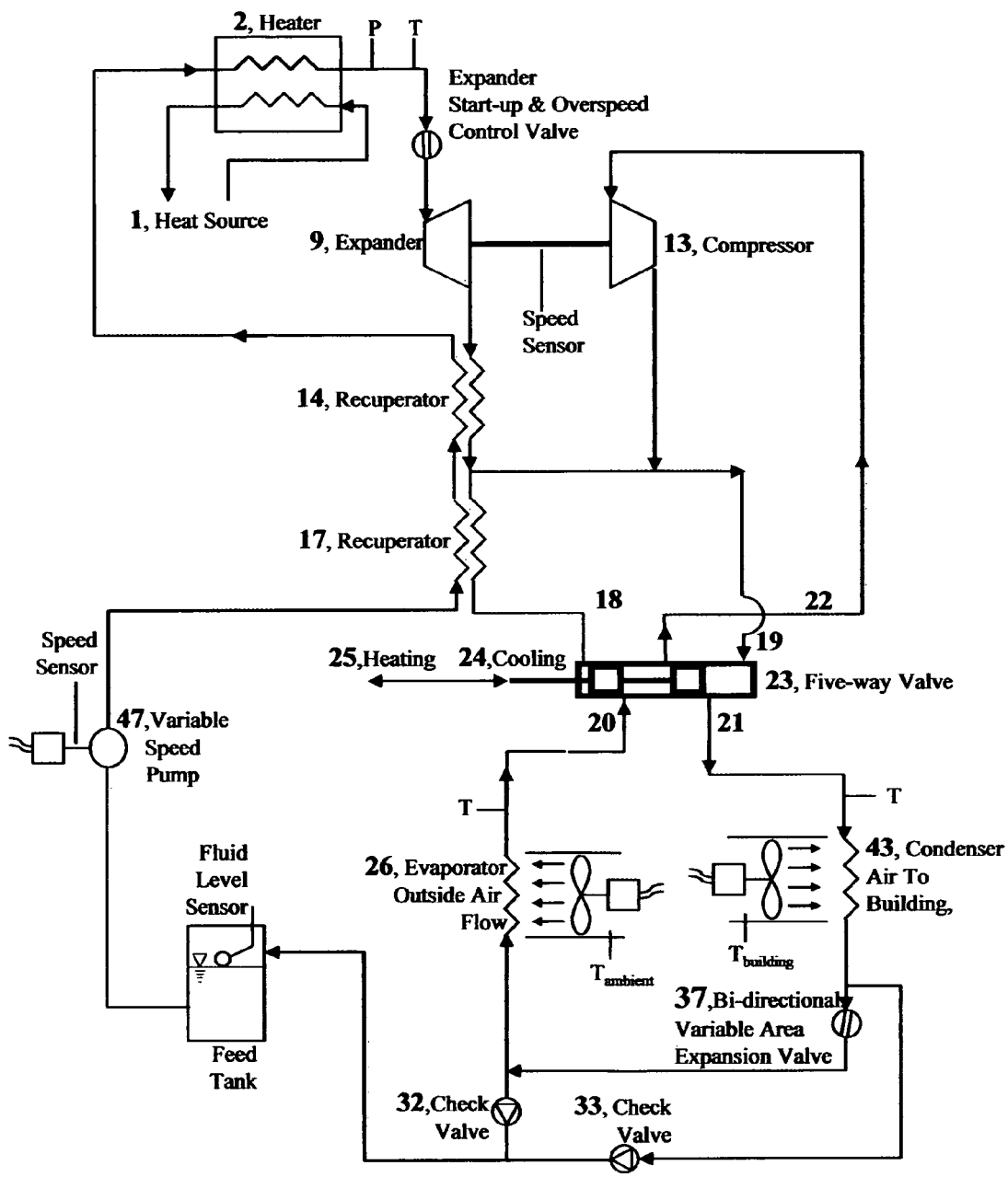
FIG. 2 is a diagrammatic view of the prior art apparatus as configured for heating an environmentally controlled space.
Figure 3:
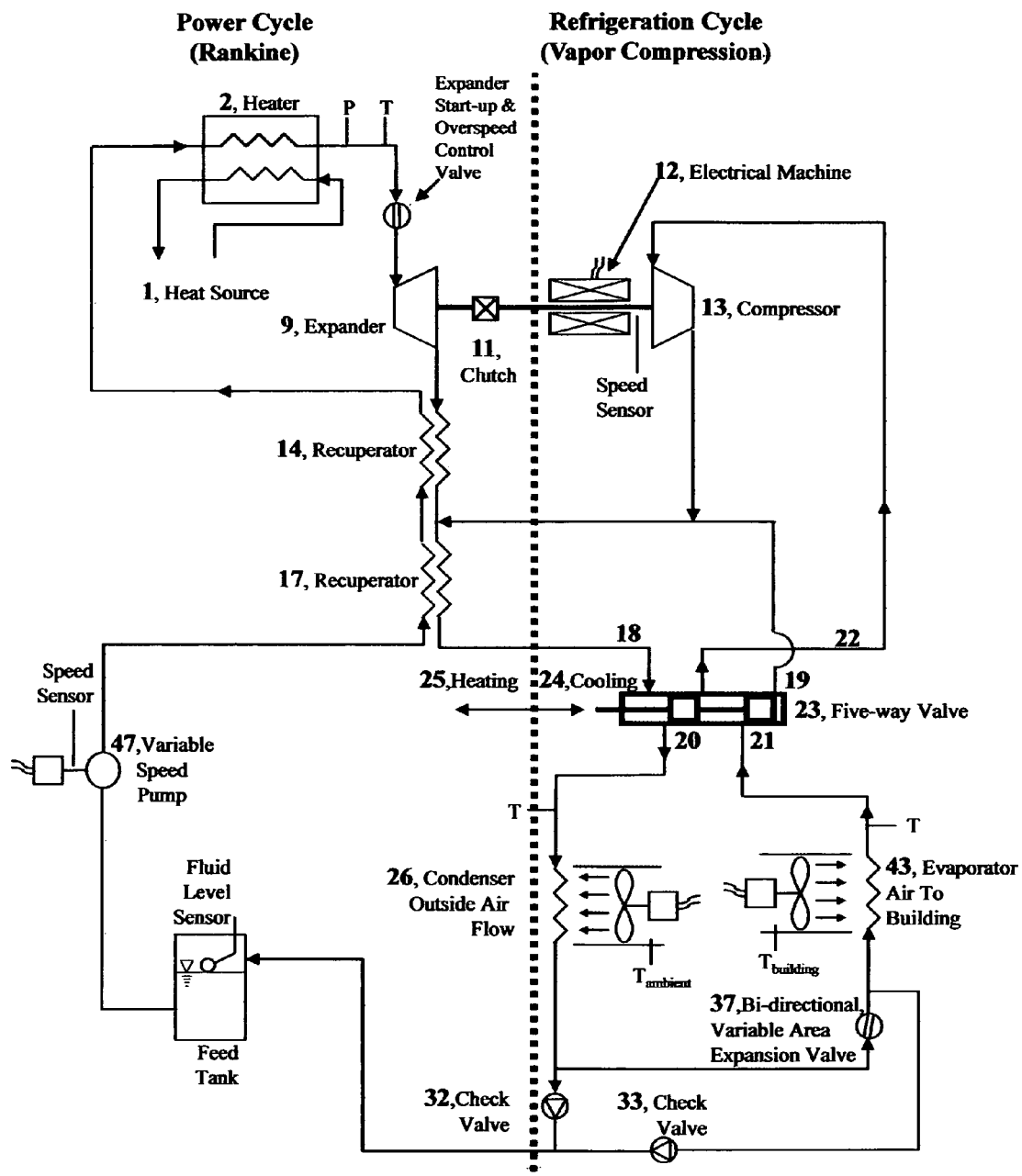
FIG. 3 is a diagrammatic view of the apparatus as configured for cooling with an integrated electrical machine, which could act as a generator only, a motor only, or as both a motor/generator.
Figure 4:
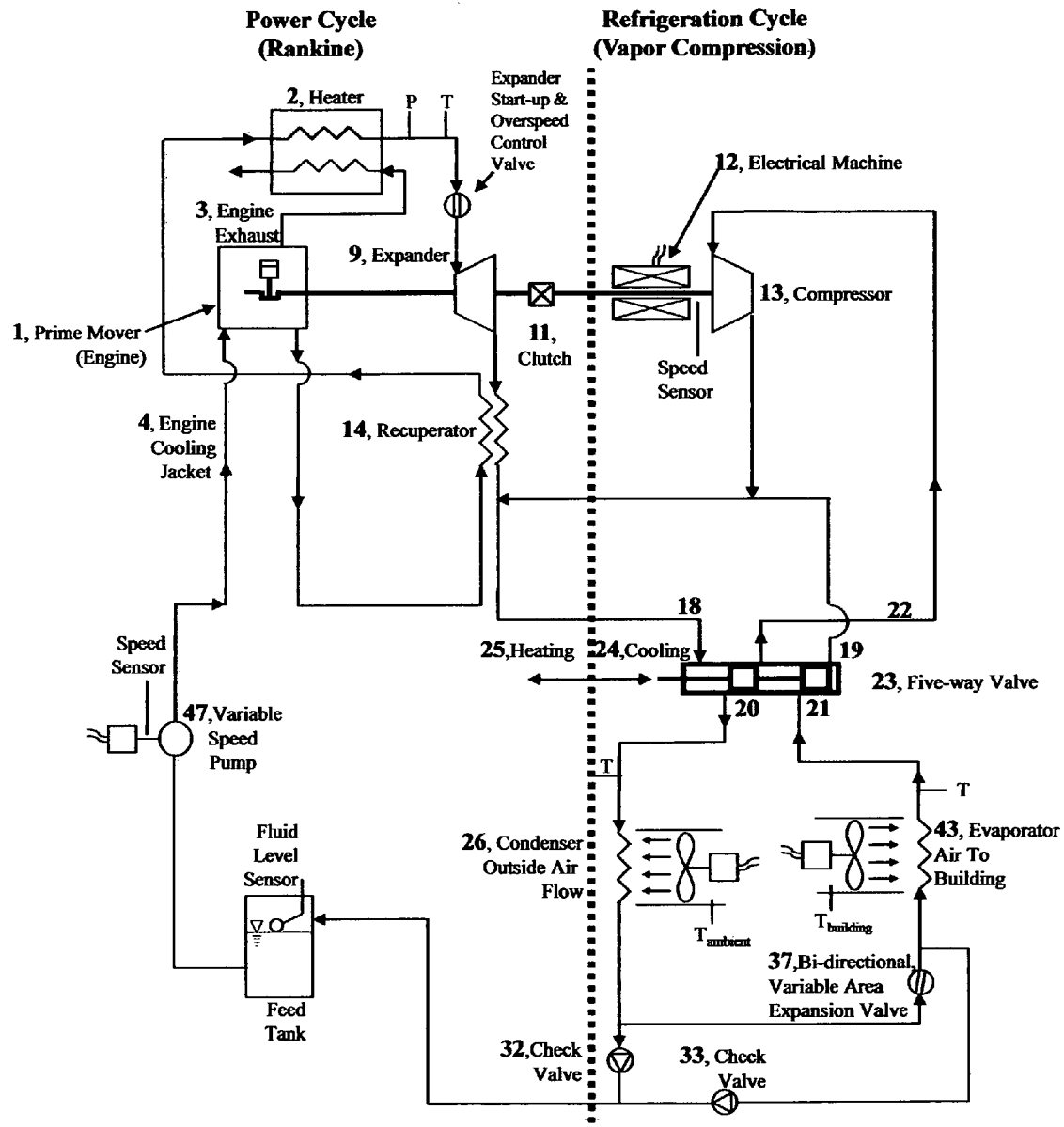
FIG. 4 is a diagrammatic view of the apparatus as configured for cooling an environmentally controlled space with an integrated prime mover, such as an internal combustion engine, from which waste heat is used to drive or assist in driving the cooling and heating cycle, plus an integrated electrical machine, which could act as a generator or as a motor.

FIG. 4 illustrates the self-contained, portable system of with the fuel-driven prime mover integrated with the Rankine power cycle and heat pump cycles. For the purposes of illustration only, the prime mover 1 will be referred as an internal combustion engine or simply an engine 1. The engine 1 output shaft is directly coupled to the expander 9, which is itself coupled to other major rotating components in the system. Since most engines reject the majority of heat produced from the fuel to the environment, in this invention, the normally rejected heat is captured and used to drive the expander 9. FIG. 4 illustrates how different grades of heat, or heat available at different temperatures from the engine 1, may be captured and introduced to the Rankine cycle of the system. By example, the heat recovered by the engine cooling jacket 4 is usually lower temperature, typically less than 150° C. In this case, no additional heat is attempted to be recovered from the compressor 13 outlet flow. Recuperator 14 is shown to recover usable heat remaining in the expander 9 outlet flow. The optimum arrangement of recuperation and heating the working fluid will vary from application to application depending on the temperatures and amounts of heat available from various sources within the engine 1, any other sources of available heat, and the importance of overall system efficiency versus cost for the additional system complexity.

The engine exhaust 3 can often exceed 500° C. and is shown in FIG. 4 to supply the heat input for the heater 2. The working fluid exits the heater 2, having recovered a significant portion of the heat from the engine exhaust 3, and produces additional shaft horsepower as it flows through the expander 9 to supplement the shaft horsepower supplied by the engine 1. In this respect, the Rankine cycle portion of the system acts as a bottoming cycle for the engine 1.

One of the major benefits of this system arrangement of combined shaft power is that all the power from the engine 1 and expander 9 can be applied as needed to any combination of air conditioning (or heating) load and electrical load demand. The system includes an electrical machine 12 that can operate as a generator or a motor. For electrical power supplied by the system, the engine 1 can be controlled to operate at a constant speed, and therefore supply the electrical power at a constant frequency. As either the compressor 13 or generator 12 load increases, the fuel supply to the engine 1 is increased to increase the engine 1 output torque, but the speed can be maintained as constant to keep the electrical output frequency constant. An increase in the fuel flow to the engine 1 will also increase the heat supplied to the heater 2, which increases the amount of supplemental shaft horsepower supplied to the system from the expander 9.

Although FIG. 4 depicts the rotating components on a common shaft, in some applications it may be beneficial to have one or more of the components rotating at different speeds through use of a gearbox or other speed reducing or speed increasing device.

The clutch 11 becomes preferable, when multiple modes of operation are desired. The clutch 11 could be externally actuated or a passive device, such as an overrunning clutch. The electric machine 12 could be a generator only, in which case the clutch 11 is not necessary, as the generator could only operate when the prime mover and expander 9 are operable. The electric machine 12 could be a motor only, in which case the clutch 11 could be a passive clutch of the overrunning type, which would allow the electric motor to drive the vapor cycle compressor 13 independent of the expander 9. Further, the electric machine 12 could be a combination motor and generator, either independent devices or a single multi-function device. A single machine that can operate as either a motor or generator could be any of several devices well known to those experienced in the art.

The Rankine cycle, which drives the expander 9, is supplied by a variable speed liquid pump 47. Whether the system is in heating or cooling mode is determined by the position of the control valve 23. If in cooling mode, the control valve 23 is moved to position 24. Warm gas from the recuperator 14 and compressor 13 are directed through the common condenser 26, which condenses the working fluid to a liquid, ready to be used by the Rankine and refrigeration cycles. In cooling mode, as shown in FIG. 4, some of the liquid working fluid from the condenser 26, passes through a controllable expansion valve 37 into the evaporator 43, where heat is removed from the air in the space that is desired to be cooled. The working fluid, now in a gas state at low pressure, passes to the compressor 13 to be pressurized back to the pressure of the fluid exiting the recuperator 14.

If the system is in heating mode, the control valve 23 moves to the heating position 25, where the warm gaseous working fluid leaving the recuperator 14, combined with the gaseous discharge from the compressor 13, flows through the control valve 23, into the evaporator 43, which now operates as a condenser by heating the air in the environmental controlled space that is desired to be heated. The working fluid flows through the controllable expansion valve 37 in the reverse direction of when the system is in cooling mode, throttling the working fluid and dropping the pressure of the working fluid. The working fluid enters the condenser 26, which now operates as an evaporator, removing heat from the outside air. The gaseous working fluid leaving the condenser 26 flows through the control valve 23 to the compressor to be pressurized to the system pressure at the outlet of the recuperator 14. The check valves 32 and 33 assure that the liquid working fluid flows in the proper direction, regardless of which mode the system operates.

CONCLUSION, RAMIFICATION, AND SCOPE

The present invention provides an apparatus for a self-contained, portable power, cooling and heating system driven by an internal combustion engine, utilizing waste heat from the engine to drive a reconfigurable thermodynamic cycle that can be used to selectively cool or heat an environmentally controlled space, such as a room, building, or vehicle, and can provide electrical power. The system provides a design which reasonably balances the need to maximize efficiency, while also keeping the design cost effective.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An apparatus for cooling, heating, and generating electricity, comprising:
   a working fluid capable of both gas and liquid phases;
   a heater configured to warm the working fluid;
   a piston engine including an exhaust coupled to provide heat energy to the heater;
   a liquid pump connected to transfer said working fluid to the heater;
   a gas expander coupled to receive the working fluid from the heater and mechanically connected to a drive shaft of the piston engine to supplement power provided by the piston engine;
   a gas compressor mechanically connected to the drive shaft;
   a clutch mechanically coupled to the drive shaft between the gas expander and gas compressor;
   an electric machine mechanically attached to the drive shaft and configured to generate electricity from rotation of the drive shaft;
   a first heat exchanger configured to transfer heat from said working fluid exiting said gas expander to said working fluid entering said heater;
   a second heat exchanger coupled to receive said working fluid from an outlet of a hot side of said first heat exchanger and said working fluid from an outlet of said compressor;
   a thermal expansion valve coupled to receive said working fluid from an outlet of said second heat exchanger;
   a third heat exchanger coupled to receive the working fluid from the thermal expansion valve; and
   a selector valve coupled to controllably reverse a function of said second heat exchanger and said third heat exchanger.

2. The apparatus according to claim 1, further including said electric machine mechanically connected by the clutch to said drive shaft interconnecting said piston engine and said gas expander, said compressor attached to said electric machine by said drive shaft, allowing said electric machine to operate as a motor and drive said compressor independently from said piston engine or said gas expander.

3. The apparatus according to claim 1, further including said working fluid connected from said liquid pump to the piston engine, to use said working fluid as a coolant for the piston engine, said working fluid, further connected to transfer to an inlet of a cold side of said first heat exchanger.

4. A heating, cooling, and power device, comprising:
   a piston engine including an exhaust and a cooling jacket;
   a liquid pump configured to transfer a working fluid to the cooling jacket of the piston engine;
   a heater configured to receive the working fluid from the cooling jacket of the piston engine and transfer heat from the exhaust of the piston engine to the working fluid in the heater;
   a shaft coupled to the piston engine, wherein the piston engine is configured to provide power to rotate the shaft;
   a expander mechanically coupled to the shaft and configured to supplement the power of the piston engine;
   a first heat exchanger configured to transfer heat from the working fluid exiting the expander to the working fluid entering the heater;
   a compressor mechanically coupled to the shaft;
   a second heat exchanger coupled to receive said working fluid from an outlet of a hot side of the first heat exchanger and the working fluid from an outlet of the compressor;
   a thermal expansion valve coupled to receive the working fluid from an outlet of the second heat exchanger;
   a third heat exchanger coupled to receive the working fluid from the thermal expansion valve;

a selector valve coupled to controllably reverse a function of the second heat exchanger and the third heat exchanger;
an electrical machine
an electric machine mechanically coupled to the shaft and configured to produce electricity from rotation of the shaft; and
a clutch coupled to the shaft to disconnect the compressor from the expander and allow the compressor to be driven by the electrical machine.

5. A heating, cooling, and power device, comprising:
a piston engine including an exhaust;
a heater configured to transfer heat from the exhaust of the piston engine to a working fluid within the heater;
a shaft mechanically coupled to the piston engine, wherein the piston engine is configured to provide power to rotate the shaft;
an expander mechanically coupled to the shaft and configured to supplement the power of the piston engine
a heat pump including, a compressor mechanically coupled to the shaft, a second heat exchanger coupled to receive the working fluid from an outlet of the compressor, a thermal expansion valve coupled to receive the working fluid from an outlet of the second heat exchanger, and a third heat exchanger coupled to receive the working fluid from the thermal expansion valve;
an electrical machine mechanically coupled to generate electricity from rotation of the shaft; and
a clutch configured to disconnect the heat pump from the piston engine and expander to allow the electrical machine to power the heat pump.

6. The heating, cooling, and power device of claim 5, further including:
a first conduit coupled between the heater and expander; and
a recuperator comprising a second conduit coupled between the expander and recuperator.

7. The heating, cooling, and power device of claim 5, wherein the heat pump further includes a valve connected to the second heat exchanger and third heat exchanger to switch the heat pump between a heating mode and a cooling mode.

8. The heating, cooling, and power device of claim 5, further including a liquid pump comprising a second conduit coupled between the liquid pump and heater and configured for transporting a working fluid.

9. A method of making a heating, cooling, and power system, comprising:
providing a piston engine including an exhaust;
providing a shaft configured to be rotated by the piston engine;
providing a heater configured to transfer heat from the exhaust to a working fluid in the heater;
providing an expander mechanically coupled to the shaft and configured to supplement mechanical shaft power provided by the piston engine;
providing an electrical machine mechanically coupled to generate electric current from rotation of the shaft;
providing a heat pump including, a compressor mechanically coupled to the shaft, and a second heat exchanger coupled to receive the working fluid from an outlet of the compressor; and
providing a clutch mechanically coupled to the shaft between the piston engine and electrical machine.

10. The method of claim 9, further including:
providing a first heat exchanger comprising a first conduit coupled between the expander and the first heat exchanger, the first conduit configured for transporting a working fluid;
providing an expansion device comprising a second conduit coupled between the first heat exchanger and the expansion device, the second conduit configured for transporting the working fluid; and
providing a third heat exchanger comprising a third conduit coupled between the expansion device and third heat exchanger, the third conduit configured for transporting the working fluid.

11. The method of claim 9, further including providing a valve to switch the heat pump between a heating mode and a cooling mode.

* * * * *

UNITED STATES PATENT AND TRADEMARK OFFICE
CERTIFICATE OF CORRECTION

PATENT NO.        : 9,222,372 B2
APPLICATION NO.   : 12/802219
DATED             : December 29, 2015
INVENTOR(S)       : Dwayne M. Benson Page 1 of 1

It is certified that error appears in the above-identified patent and that said Letters Patent is hereby corrected as shown below:

In the specification

Column 6, line 54, change "a expander" to --an expander--.

Column 7, line 4, delete line "an electrical machine".

Column 7, line 5, change "an electric machine" to --an electrical machine--.

Signed and Sealed this
Sixteenth Day of August, 2016

Michelle K. Lee
*Director of the United States Patent and Trademark Office*